United States Patent [19]

Sugita et al.

[11] 4,275,269
[45] Jun. 23, 1981

[54] PUBLIC ADDRESS SYSTEM

[75] Inventors: Junkichi Sugita, Yokohama; Yuzo Fuse, Tokyo, both of Japan

[73] Assignee: Sony Corporation, Tokyo, Japan

[21] Appl. No.: 60,036

[22] Filed: Jul. 24, 1979

[30] Foreign Application Priority Data

Jul. 27, 1978 [JP] Japan .................... 53-92008

[51] Int. Cl.³ .................................. H04R 3/02
[52] U.S. Cl. .................................. 179/1 FS
[58] Field of Search ............... 179/1 F, 1 FS, 1 HF, 179/1 P, 82; 455/24

[56] References Cited

U.S. PATENT DOCUMENTS

| 3,105,877 | 10/1963 | Miller et al. | 179/1 FS |
| 3,922,488 | 11/1975 | Gabr | 179/1 FS |

*Primary Examiner*—Bernard Konick
*Assistant Examiner*—Joseph A. Popek
*Attorney, Agent, or Firm*—Hill, Van Santen, Steadman, Chiara & Simpson

[57] ABSTRACT

A public address system having a microphone, an amplifier which amplifies the output from the microphone and a speaker assembly which receives the output from the amplifier and reproduces a sound, in which the microphone is provided with a transmitter generating an electromagnetic wave and the speaker assembly has two receiving coils disposed perpendicular to each other. The outputs from the receiving coils are used to control the level of an audio signal applied to the speaker assembly and thereby to avoid the occurrence of howling.

3 Claims, 4 Drawing Figures

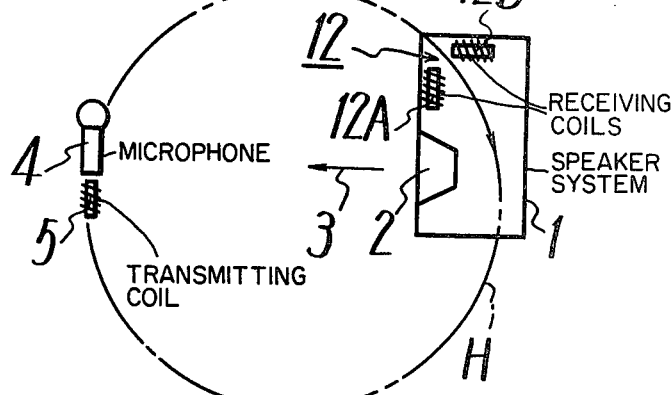
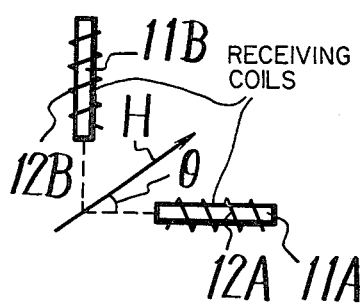
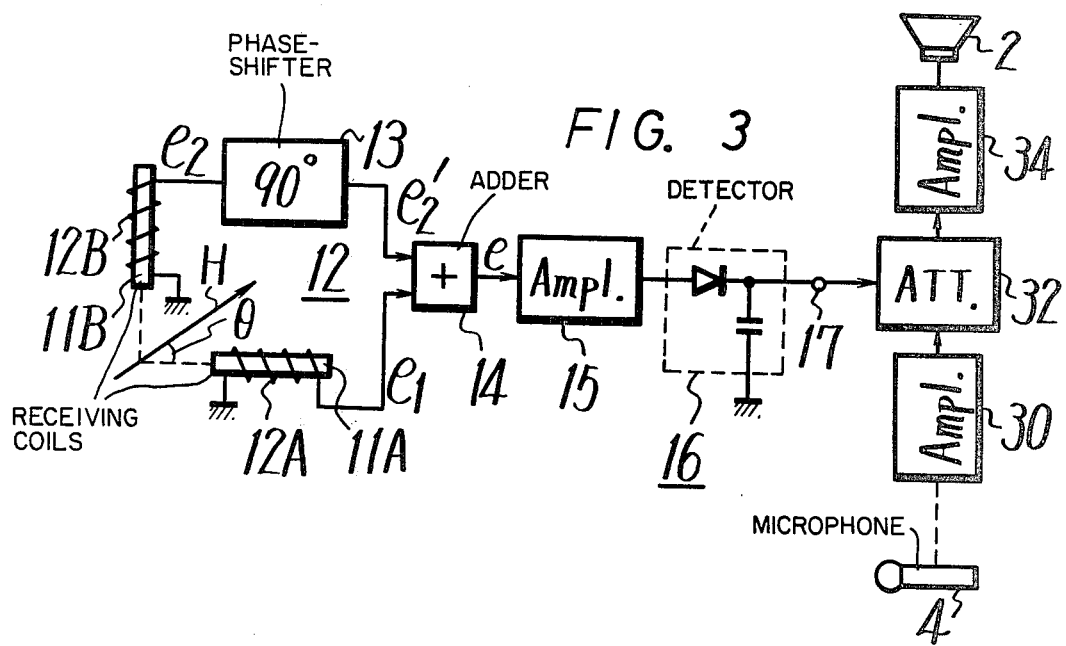
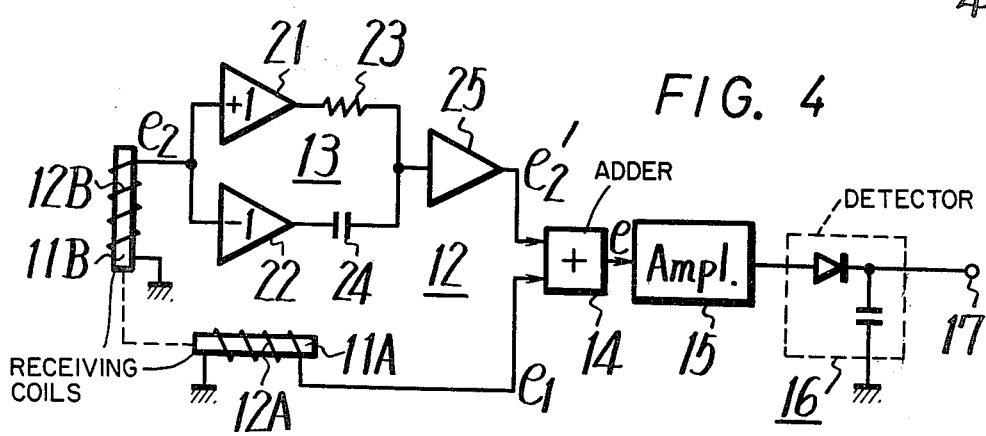

PUBLIC ADDRESS SYSTEM

BACKGROUND OF THE INVENTION

1. Field of the Invention

The present invention relates generally to a public address system, and is directed more particularly to a public address system with a device for eliminating howling.

2. Description of the Prior Art

In a speaker or loudspeaker assembly in which one or a plurality of speakers are installed in a hall and a speech received by a microphone is emitted by the speakers, a howling is caused when the microphone is brought near the speakers. To avoid this howling, there has been proposed such a method in which a transmitter generating a constant signal is located near a microphone, while a receiver is located near a speaker, so that when the microphone comes near the speaker, the signal from the transmitter is received by the receiver and then the signal supplied from the microphone to the speaker is attenuated to avoid the howling. In this case, a transmitter and a receiver, each utilizing the electromagnetic induction, are practically used as the above-mentioned transmitter and receiver, respectively. That is, the transmitter is formed such that a current of high frequency, for example, 1 $MH_z$ flows through its transmitting coil to emit an induction magnetic flux while the receiver is so formed that its receiving coil detects the induction magnetic flux from the transmitter.

In this case, the level of the voltage induced across the receiving coil is varied in response to the angle of the induction magnetic flux from the transmitting coil with respect to the receiving coil, and when the induction magnetic flux is perpendicular to the receiving coil, no voltage is induced in the receiving coil. Thus, the operation is not reliable and if the microphone is moved near the speaker, prevention of howling is not assured.

OBJECTS AND SUMMARY OF THE INVENTION

Accordingly, an object of the invention is to provide a public address system with a device which will avoid the occurrence of howling.

Another object of the invention is to provide a public address system which effectively avoids howling even when a microphone and a speaker system are in any positional relation.

A further object of the invention is to provide a public address system, in which two receiving coils are disposed perpendicular with each other in a speaker system and a signal received by the coils is detected to effectively avoid the howling generated between a microphone and the speaker system.

According to an aspect of the present invention there is provided a public address system having a microphone, a speaker system converting an output from the microphone into a sound, a transmitting coil provided in the microphone and a receiving device provided in the speaker system and receiving a signal emitted from the transmitting coil with, an output from the receiving device being used to vary the level of a signal applied to a speaker of the speaker system. The receiving device comprises two receiving coils located perpendicular to each other, a phase shifter for phase-shifting a signal obtained in one of the two receiving coils, an adder for adding the phase-shifted signal and a signal obtained in the other of the receiving coils, and a detector for detecting the resultant added signal.

The other objects, features and advantages of the present invention will become clear from the following description taken in conjunction with the accompanying drawings in which like reference numerals designate the same elements or parts.

BRIEF DESCRIPTION OF THE DRAWINGS

FIG. 1 is a schematic diagram showing a general construction of the public address system according to the present invention;

FIG. 2 is a plan view showing the positional relation of receiving coils used in the public address system of the invention; and FIGS. 3 and 4 are circuit diagrams respectively showing receiving circuits used in the invention.

DESCRIPTION OF THE PREFERRED EMBODIMENTS

FIG. 1 is a schematic diagram showing a general construction of an example of the public address system according to the present invention. In the example of the invention shown in FIG. 1, a speaker system 1 includes a loudspeaker 2 and also a receiving assembly 12 consisting of two receiving coils 12A and 12B which are located perpendicular to each other. A microphone 4 has a transmitting coil 5 which generates an induction magnetic flux. The microphone 4 and the speaker system 1 are located in a field such as a hall in which a sound is to be broadcast. In such a case, it is assumed that one or a plurality of speaker systems are located in the hall and the microphone 4 can be freely moved by a user in the sound broadcast. As will be described later, the output from the microphone 4 is fed to the speaker 2 through a cable or wireless and through an amplifier.

The coils 12A and 12B, which are located perpendicular to each other, are wound on cores 11A and 11B, respectively, as shown in FIG. 2. An induction magnetic flux H generated by the transmitting coil 5, in response to an output from an oscillator (not shown) in the microphone 4, is selected so as to be in the plane in which the receiving coils 12A and 12B lie, as shown in FIG. 1 or 2. For example, if as shown in FIG. 1, the speaker 2 of the speaker system 1 emits a sound in the direction indicated by an arrow 3, two receiving coils 12A and 12B in the speaker system 1 are located perpendicular with each other in a plane parallel to the plane of the sheet of the drawing and the induction magnetic flux H from the transmitting coil 5 located near the microphone 4 also exists in the plane parallel to the plane of the sheet.

According to the invention, further as shown in FIG. 3, a signal $e_2$ obtained from one of the receiving coils, such as the receiving coil 12B is fed to a phase shifter 13 to be phase-shifted by 90°, and the phase-shifted signal from the phase shifter 13 and also the signal $e_1$ from the other receiving coil 12A are applied to an adder 14 to be added to each other. The added signal from the adder 14 is applied through an amplifier 15 to a detector 16 which delivers its detected output to an output terminal 17.

In the above system, if a high frequency current of, for example, $1MH_z$ is supplied to the transmitting coil 5, the wave length of the electro-magnetic wave from the transmitting coil 5 is 300 m which is much longer than the distance between the transmitter and receiver. When the wave length of the signal from the transmitting coil 5 is sufficiently longer than the distance between the transmitter and receiver, the voltages induced in the receiving coils 12A and 12B are always same or opposite in phase.

Accordingly, if it is assumed that the distance between the transmitter and receiver is taken as $\gamma$, the angle between the magnetic flux H and the receiving coil 12A as $\theta$ (as shown in FIGS. 2 and 3), and the angular frequency of the magnetic flux H as $\omega$, respectively, voltages e1 and e2, which are induced in the receiving coils 12A and 12B, are expressed as follows:

$$e1 = (G/\gamma^3) \cos\theta \cos\omega t \ldots \quad (1)$$

$$e2 = (G/\gamma^3) \sin\theta \cos\omega t \text{ or } -(G/\gamma^3) \sin\theta \cos\omega t \ldots \quad (2)$$

where G is a constant.

Thus, an output voltage e2' from the phase shifter 13 is expressed as follows:

$$e2' = (G/\gamma^3) \sin\theta \sin\omega t \text{ or } -(G/\gamma^3) \sin\theta \sin\omega t \ldots \quad (3)$$

Therefore, an output voltage e from the adder 14 is expressed as follows:

$$\begin{aligned} e &= e1 + e2' \quad (4) \\ &= \frac{G}{\gamma^3}(\cos\theta \cos\omega t + \sin\theta \sin\omega t) \\ &\quad \frac{G}{\gamma^3}(\cos\theta \cos\omega t - \sin\theta \sin\omega t) \\ &= \frac{G}{\gamma^3}\cos(\omega t - \theta) \text{ or } \frac{G}{\gamma^3}\cos(\omega t + \theta) \end{aligned}$$

From the equation (4) it will be apparent that, according to the present invention, the added voltage e is varied in only phase and is not varied in amplitude or level even if the angle $\theta$ between the magnetic flux H and the receiving coil 12A is varied. Therefore, a DC voltage, which is not varied in level regardless of the angle $\theta$ between the magnetic flux H and the receiving coil 12A but is varied in level in response to the distance $\gamma$ between the transmitter and receiver, is obtained at the output terminal 17 led out from the detector 16 as a detected output.

As shown in FIG. 3, the sound output from the microphone 4 is fed to a pre-amplifier 30 and the output therefrom is fed through a variable attenuator 32 to a power amplifier 34 to which the loudspeaker 2 is connected. The variable attenuator 32 is supplied with the output from the detector 16 through the output terminal 17 for controlling the attenuation factor thereof. As the microphone 4 moves near the speaker system 1, the magnitude of the output from the detector 16 increases and hence the attenuation factor of the attenuator 32 increases correspondingly. Thus, the output level of the attenuator 32 to the power amplifier 34 becomes low.

It may be also possible that the output from the microphone 4 is applied to the amplifier 30 by a wireless manner. In such a case, it is necessary that the transmitter is accommodated in the microphone 4 and the receiving circuit, which will convert the signal from the transmitter into a sound signal, is provided at the side of the speaker system 1.

Further, in place of the variable attenuator 32 such a technique can be of course used in which the gain of the amplifier 30 or 34 is controlled by the output from the detector 16.

As described above, according to the system of the present invention, the distance between the transmitter and receiver can be positively detected, and when the transmitter and microphone move near the speaker within a predetermined region, the howling can be positively avoided.

In applications wherein the signal is of a narrow frequency band, the phase shifter 13 may be formed of, for example, a buffer circuit 21, inverter 22, resistor 23, capacitor 24 and buffer circuit 25 as shown in FIG. 4. In this case, if it is assumed that the resistance value of the resistor 23 is taken as R and the capacity of the capacitor 24 as C, it is sufficient that $(1/RC) = \omega$ is satisfied.

As described above, according to the present invention the stable operation is achieved and the howling is positively avoided.

Further, in the case of a public address system having a plurality of speakers, it is sufficient that the receiver constructed as above is located near each of the speakers.

It will be apparent that many modifications and variations could be effected by one skilled in the art without departing from the spirits or scope of the novel concepts of the present invention, so that the spirits or scope of the invention should be determined by the appended claims only.

We claim as our invention:

1. In a public address system having a movable microphone, a speaker system spaced from said microphone for converting an input from the microhone into a sound, a separate transmitting coil in the microphone, a receiving device in the speaker system for receiving a signal emitted from the transmitting coil, and an attenuation means post-connected to said receiving device for varying the level of a signal applied to a speaker of the speaker system in direct proportion to the magnitude of the signal from said receiving device, the receiving device comprising (a) two receiving coils disposed perpendicular to each other;
    (b) means for phase-shifting a signal obtained from one of the two receiving coils;
    (c) means for adding said phase-shifted signal and a signal from the other of the two receiving coils and
    (d) means for detecting the magnitude of the added signal whereby said added signal increases in magnitude as said microphone and transmitting coil are moved closer to said speaker system and said attenuation means correspondingly decreases the volume of said sound for prevention of howling.

2. A public address system as claimed in claim 1, wherein said phase-shifting means is comprised of a first series connection of a buffer circuit and a resistor, and a second series connection of an inverter and a capacitor, said first and second series connections being connected in parallel with each other.

3. A public address system as claimed in claim 2, wherein the resistance of said resistor is R and the capacitance of said capacitor is C, and wherein $(1/RC) = \omega$ where $\omega$ is the angular frequency of the signal emitted from said transmitting coil.

* * * * *